Aug. 4, 1931.  H. P. LINDERS  1,816,859

DYNAMO ELECTRIC MACHINE

Filed Feb. 20, 1930

Inventor
H. P. LINDERS
By *E. G. Huffway*
Att'y.

Patented Aug. 4, 1931

1,816,859

UNITED STATES PATENT OFFICE

HARRY P. LINDERS, OF ST. LOUIS, MISSOURI, ASSIGNOR TO WAGNER ELECTRIC CORPORATION, OF ST. LOUIS, MISSOURI, A CORPORATION OF DELAWARE

DYNAMO ELECTRIC MACHINE

Application filed February 20, 1930. Serial No. 429,864.

My invention relates to an improvement in the construction of the stationary part of a dynamo electric machine and the method of making the same. It has heretofore been proposed to form the frame of these machines of a circular tube made by rolling a sheet of steel into circular form and welding the edges together, and in order to form ventilating channels between the exterior of the laminæ of the stator member and the frame, separate metal spacing strips have been employed which have been secured in varying manner to the inner wall of the frame to form spaced supports for the stator. My invention constitutes an improvement in this practice which both reduces the cost of construction and provides a one-piece rigid frame.

Figure 1:
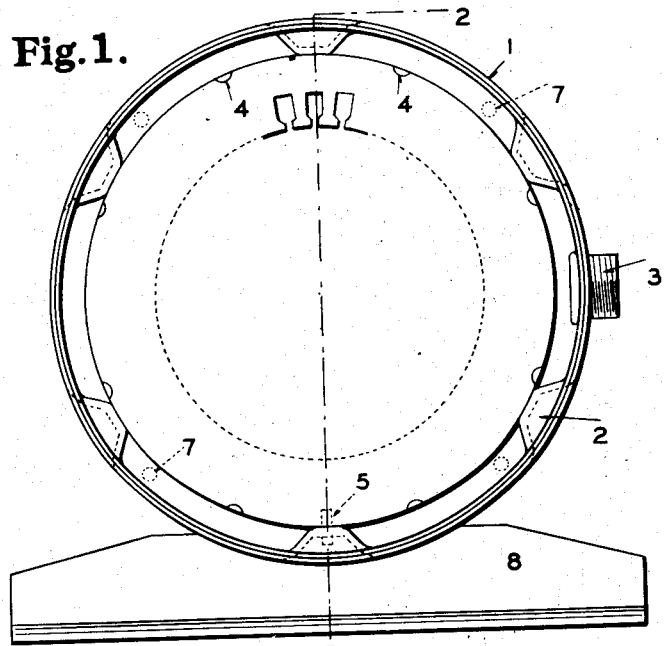
Figure 2:
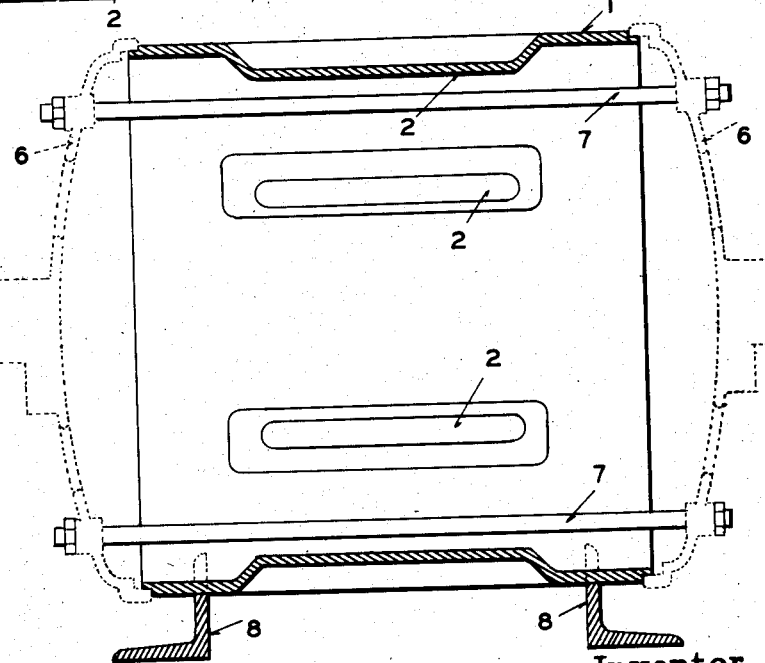

In the accompanying drawings Figure 1 is an end view of the stationary member of a motor constructed in accordance with my invention (the field winding being omitted); and Figure 2 is a cross-sectional view along the line 2 of Figure 1.

To form the stationary part of a dynamo electric machine as shown, a sheet of steel is bent into circular form and the edges welded together, making a tube 1 of larger diameter than the finished diameter of the frame. Circumferentially spaced longitudinally extending portions of the frame are then pressed inwardly to form projections 2 intermediate the ends of the frame, which operation reduces the diameter of the frame tube to the desired size. The inner faces of the projections are then machined to cause them to constitute portions of a single cylindrical surface and the wiring conduit element 3 is inserted through an opening in the frame. The stator laminæ are secured together in unit form by means of line welds 4 longitudinally extending in the known manner, and then the exterior of the unit is machined to cylindrical form and to make a press fit with the supporting projections 2 of the frame when inserted therein. To secure the stator member in the frame one or more dowel pins 5 are provided which extend through holes in the frame and into holes drilled in the laminæ body.

After the parts are assembled as described, the ends of the frame may be machined to form a circumferential shoulder, as shown, to receive the ends of the end plates 6, which latter may be held in position by through bolts 7 passing through the channels formed between the stator iron and the frame by the supporting projections 2. These channels constitute passages for circulating air over the surface of the stator member.

Frame supports are formed by means of two angle irons 8 which have arcuate depressions in one web of the shape to conform to the frame to which they are welded.

It will be apparent that by my invention the frame structure for a stationary member having the desired ventilating channels can be formed more cheaply than according to prior practices; that all problems of properly securing the stator member supports to the frame are avoided; and that a rigid one-piece sheet metal frame is produced which has all of the desirable characteristics of a cast frame.

Having fully described my invention, what I claim as new and desire to secure by Letters Patent of the United States is:

1. The method of manufacturing a stationary member for a dynamo electric machine which comprises forming a laminated stator field member of cylindrical periphery, forming a sheet metal tubular frame member of larger diameter than the desired diameter of the finished frame, pressing portions of the wall of the tube inwardly to form spaced supports for the stator member, and machining the faces of said supports to cause them to form a press fit with the stator member when the latter is inserted in the frame.

2. The method of manufacturing a stationary member for a dynamo electric machine which comprises forming a laminated stator field member of cylindrical periphery, forming a sheet metal tubular frame member, pressing portions of the wall of the tube inwardly to form spaced supports for the stator member, machining the faces of said supports to cause them to form a press fit with the stator member when the latter is inserted in the frame, and welding supports to spaced portions of the exterior of the frame.

3. A dynamo electric machine comprising a stator member and a one-piece sheet metal casing member surrounding the peripheral portion of the stator member and provided with integral inwardly depressed stator supporting portions.

4. A dynamo electric machine comprising a cylindrical stator member and a one-piece sheet metal casing member surrounding the peripheral portion of the stator member and provided with integral inwardly depressed stator supporting portions having curved inner surfaces conforming to and bearing on the periphery of the stator.

5. A dynamo electric machine comprising a stator member and a one-piece sheet metal casing member surrounding the peripheral portion of the stator member and provided with integral inwardly depressed stator supporting portions, and a pin engaging the casing and the stator to prevent their relative longitudinal movement.

6. A dynamo electric machine comprising a cylindrical stator member, and a cylindrical one-piece sheet metal casing member of larger diameter than the stator and surrounding the peripheral portion thereof, said casing being provided with integral peripherally spaced inwardly depressed portions supporting the stator and spacing it from the casing.

7. A dynamo electric machine comprising a stator member and a one-piece tubular sheet metal casing member surrounding the peripheral portion of the stator and provided with integral peripherally spaced portions engaging the stator to support the same and with other integral portions spaced from the stator to form ventilating channels.

In testimony whereof, I hereunto affix my signature, this 14th day of February, 1930.

HARRY P. LINDERS.